C. C. BLACKMORE.
SHOCK ABSORBER.
APPLICATION FILED MAY 5, 1921.
1,435,799.
Patented Nov. 14, 1922.
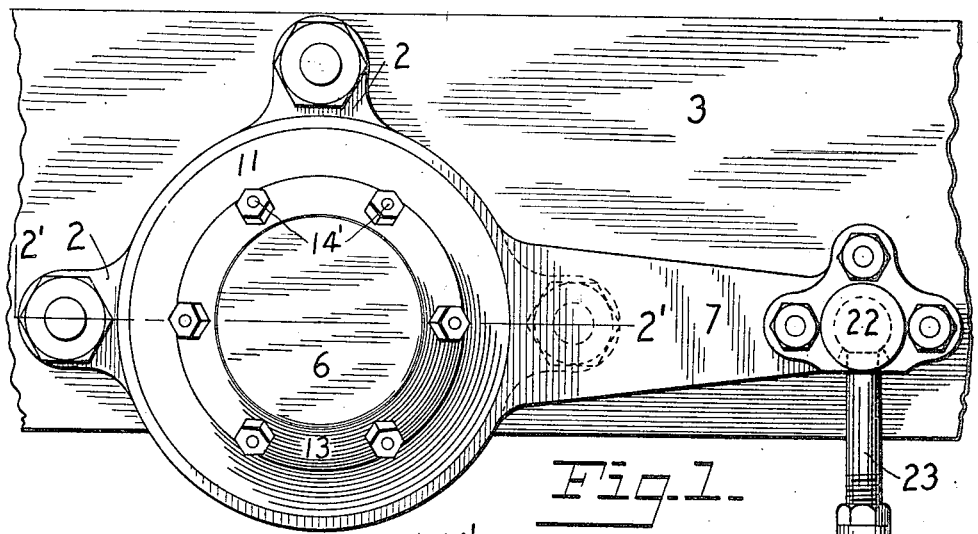
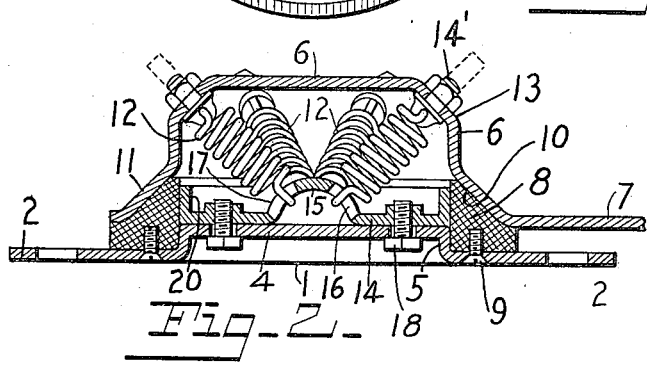
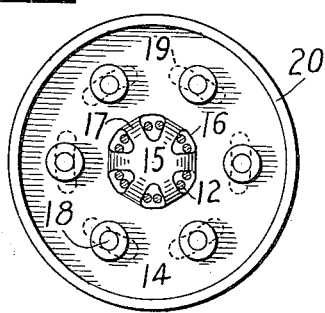
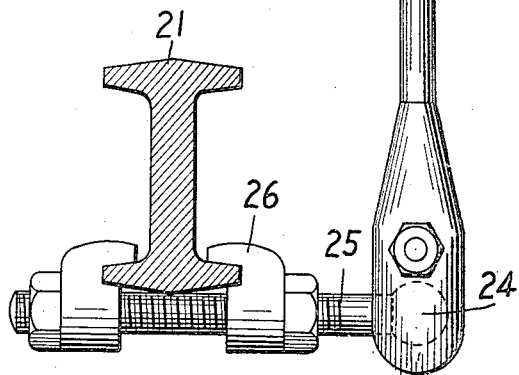
CHARLES C. BLACKMORE.
INVENTOR.
ATTORNEY.

Patented Nov. 14, 1922.

1,435,799

UNITED STATES PATENT OFFICE.

CHARLES C. BLACKMORE, OF DAYTON, OHIO.

SHOCK ABSORBER.

Application filed May 5, 1921. Serial No. 466,966.

*To all whom it may concern:*

Be it known that I, CHARLES C. BLACKMORE, a citizen of the United States, residing at Dayton, in the county of Montgomery and State of Ohio, have invented certain new and useful Improvements in Shock Absorbers, of which the following is a specification, reference being had therein to the accompanying drawing.

This invention relates to shock absorbers for automobiles and the like, and is in the nature of an improvement upon the shock absorber shown and described in the application for patent filed by me Feb. 7, 1921, Serial No. 442,984.

One object of the present invention is to provide a shock absorber of this kind, which will be very compact in its construction; and in which the springs will be so arranged that they will occupy a minimum amount of space and will exert a maximum of pull upon the movable member when the latter is displaced from its normal position.

A further object of the invention is to provide a device of this kind in which the springs will be adjustably connected with the fixed member in such a manner as to permit the normal position of the movable member to be varied with relation to the fixed member without affecting the action of the springs.

A further object of the invention is to provide a device of this kind in which the friction element will be firmly held against displacement and against distortion.

A further object is to provide a device of this kind which will be simple in its construction, inexpensive to manufacture, easy to apply to the automobile, and of a strong, durable character.

Other objects of the invention will appear as the device is described in detail.

In the accompanying drawings Fig. 1 is a plan view of a shock absorber embodying my invention, showing the same applied to the frame and axle of an automobile; Fig. 2 is a section taken on the line 2'—2' of Fig. 1; and Fig. 3 is a plan view of the connecting member.

In these drawings I have illustrated one embodiment of my invention and have shown the same as formed from sheet metal but it will be understood that this particular form of the invention has been chosen for the purpose of illustration only and that the parts may be formed from metal of any suitable kind and that the shapes and arrangements of the parts may be varied without departing from the spirit of the invention.

In that particular embodiment of the invention here illustrated I have shown the same as comprising a fixed member, or base, 1. which is preferably circular in shape and has a plurality of laterally extending lugs 2 to receive bolts, or other fastening devices, by means of which the fixed member is secured to the supporting structure, which is here shown as a part 3 of the frame of the automobile. Preferably, the central portion of the fixed member is struck outwardly, as shown at 4, to provide a space between the central portion and the frame member 3 and to also provide an annular shoulder 5.

A movable member 6 is rotatably mounted on the fixed member for rotation about an axis which preferably extends at right angles to the plane of the fixed member. As here shown, this rotatable member is in the form of a cup shaped housing having secured thereto, and preferably formed integral therewith and extending from one edge thereof, an actuating arm 7. Interposed between the two members of the device is a friction element 8 which, as here shown, is annular in form. In the present construction I have shown this annular friction element as rigidly secured to the fixed member 1 in any suitable manner, as by means of screws 9, and have shown the same as having its inner edge extending at substantially right angles to the plane of the fixed member and as bearing against the shoulder 5. The outer edge of the friction element is beveled, as shown at 10, to provide a contact surface extending obliquely to the axis of rotation of the movable member and the edge portion of said movable member is turned outwardly, as shown at 11, to provide the same with a friction surface arranged to bear against the oblique contact surface of the friction element.

The movable member is held in frictional contact with the friction element by means of springs 12 which are here shown in the form of coil springs connected at their respective ends with the movable member and with the fixed member, and which may serve not only to press the movable member into frictional contact with the friction element but also as the sole connection between the two members. These springs are so arranged that they will resist any rotation of the movable member from its normal position relatively to the fixed member and this resistance will progressively increase as the rotation of the movable member continues. In order that the housing may be made as shallow as possible, thus providing a compact structure, I have connected the inner ends of the springs with the fixed member at points near the axis about which the movable member rotates and have connected the outer ends of the springs with the housing 6 at points remote from the fixed member and from the axis of rotation of said movable member, thus causing the springs to extend obliquely to said axis. By this arrangement I am able to employ a relatively long spring with a shallow housing and the arrangement of the springs is such that they will exert upon the housing a maximum of pull when the latter is displaced from its normal position relatively to the fixed member. The outer ends of the springs may be connected with the housing in any suitable manner but, as here shown, the outer corners of the housing are flattened as shown at 13 and the springs are secured to these flattened portions by means of bolts 14' which extend through the same and have their heads, which are arranged on the inner side of the housing, apertured to receive the hook-shaped ends of the springs. If desired, the bolts may be of relatively great length so that they can be inserted in the wall of the housing and the springs connected thereto, after they have been connected with the fixed member and before they have been placed under tension, and by then tightening down the nuts on the bolts the springs may be placed under tension and the heads of the bolts drawn tightly against the wall of the housing to form a firm connection between these parts. If desired, the projecting ends of the bolts may be removed after the nuts have been tightened down.

The inner ends of the springs may be connected with the fixed member 1 in any suitable manner but I prefer that this connection should be such that it can be adjusted about the axis of the device to enable the normal position of the movable member to be varied with relation to the fixed member. As will be apparent from Fig. 1 the fixed member must be secured to the frame in substantially a predetermined position and it sometimes happens in applying the device to automobiles of different kinds that it is desirable that the arm 2 of the movable member should project at an angle different from that shown in Fig. 1 and by making the connection between the springs and the fixed member adjustable this can be accomplished without affecting the action of the springs. In that form of the device here shown, I have provided a connecting device, or member, 14, which is adjustably secured to the central portion 4 of the fixed member and is provided with means near the center thereof for attaching the springs 12 thereto. As here shown, the central portion of the connecting member 14 is pressed outwardly, as shown at 15, and has formed therein a plurality of openings 16, thus providing a series of bars 17, which are spaced from the surface of the part 4 of the fixed member and about which the hook-shaped inner ends of the springs may be engaged. The connecting member may be attached to the fixed member in any suitable manner as by means of bolts, or screws, 18 extending through the two parts. In order that the movable member may be adjustable about the axis of the device I provide the part 4 of the fixed member with a plurality of openings which are so arranged that the position of each screw 18 may be adjusted about said axis. In the present instance I have provided for each screw an elongated slot 19 through which it extends and which is of such length that it may be shifted an appreciable distance in either direction from the center of the slot. The screws, as here shown, are threaded into apertures in the connecting member and it will be apparent that by loosening the screws the position of the connecting member may be shifted and that it may be then secured in its adjusted position by tightening down the screws. I also prefer to provide the connecting member at its outer edge with an annular flange 20 which is arranged to engage the inner surface of the friction element 8, above the shoulder 5, and to assist in holding this friction element against displacement and against distortion. It will be noted that the friction element, which is approximately triangular in cross section, is in contact with metal parts of the two members for substantially the full area of its several surfaces.

The arm 7 of the movable member is operatively connected with a part of the automobile and has movement relatively to the frame, such as the axle 21 and, as here shown, the arm is connected, by a ball and socket joint 22, with the upper end of a link, or connecting rod, 23, the lower end of which is connected by a ball and socket joint 24 with a lug 25 which is attached to the axle 21 by means of clamps 26.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a device of the character described, a fixed member, a second member rotatably mounted on said fixed member, a friction element interposed between said members, and springs connected at their ends with the respective members, and each extending at an angle to the axis of rotation of said second member.

2. In a device of the character described, a fixed member, a second member rotatably mounted on said fixed member, a friction element interposed between said members, and springs connected at their ends with the respective members, and each extending obliquely to the axis of rotation of said second member.

3. In a device of the character described, a fixed member having a part provided with a friction surface, a cup shaped member rotatable about an axis extending transversely to said fixed member and having a friction surface to cooperate with the first mentioned friction surface, and springs connected at their inner ends with said fixed member near the axis of rotation of said rotatable member and connected at their outer ends with said rotatable member at points remote from said fixed member and from said axis.

4. In a device of the character described, a fixed member, a cup-shaped member rotatably mounted on said fixed member and having its outer corner flattened and provided with apertures, a friction element arranged between said members, springs connected at their inner ends with said fixed member near the center thereof, and fastening devices extending through the flattened outer corner of said rotatable member and connected with the outer ends of the respective springs.

5. In a device of the character described, a fixed member having a part provided with a friction surface, a movable member mounted for rotation about an axis extending transversely to said fixed member and having a friction surface to cooperate with the first mentioned friction surface, springs connected at their outer ends with said rotatable member and connected at their inner ends with said fixed member, the last mentioned connections being adjustable transversely to the respective springs with relation to said fixed member.

6. In a device of the character described, a fixed member, a second member rotatably mounted on said fixed member, a friction element arranged between said members, springs connected at their outer ends with said rotatable member, and means for connecting the inner ends of said springs with said fixed member, said connecting means being adjustable about the axis of said rotatable member.

7. In a device of the character described, a fixed member, a second member rotatably mounted on said fixed member, a friction element arranged between said members, a connecting device adjustably mounted on said fixed member, and springs connected at their respective ends with said rotatable member and with said connecting device.

8. In a device of the character described, a fixed member, a second member rotatably mounted on said fixed member, a friction element arranged between said members, a connecting device comprising a plate mounted upon said fixed member and having its central portion raised and provided with apertures, means for connecting said plate with said fixed member in adjusted positions about the axis of said rotatable member, and springs connected at their outer ends with said rotatable member and having at their inner ends parts extending through the respective apertures in said raised portion of said plate to connect the same thereto.

9. In a device of the character described, a fixed member having its central portion offset from the plane thereof, a movable member rotatably mounted on said fixed member, a friction element interposed between said members, a connecting plate mounted on the offset portion of said fixed member for adjustment about the axis of said rotatable member, means for rigidly securing said plate in adjusted positions on said fixed member, springs connected at their outer ends with said rotatable member and at their inner ends with said plate.

10. In a device of the character described, a fixed member having its central portion offset to form an annular shoulder, an annular friction element mounted on said fixed member and engaging said shoulder, a second member rotatably mounted on said fixed member and having a part to engage said friction element, and springs connecting said members one to the other to resist the rotation of said rotatable member.

11. In a device of the character described, a fixed member having its central portion offset to form an annular shoulder, an annular friction member mounted on said fixed member and bearing against said shoulder, and having its outer surface beveled, a rotatable member mounted on said fixed member and having a portion arranged to engage the beveled contact surface of said friction element, and springs connecting said rotatable member with said fixed member and extending obliquely to the axis of said rotatable member.

12. In a device of the character described, a fixed member having its central portion offset to form an annular shoulder, an annular friction element mounted on said fixed member, having its outer portion beveled to form a contact surface and having its inner edge engaging said shoulder and projecting above the same, a part carried by said fixed member and having a flange extending upwardly therefrom to engage the inner surface of said friction element above said shoulder, and springs connecting said rotatable member with said fixed member and arranged to resist the rotation of said rotatable member relatively to the fixed member.

13. In a device of the character described, a fixed member having its central portion offset to form an annular shoulder, an annular friction element mounted on said fixed member, having its outer portion beveled to form a contact surface and having its inner surface in engagement with and projecting above said shoulder, a connecting plate mounted on said offset portion of said fixed member and having an annular flange arranged to engage the inner surface of said friction element above said shoulder, a cup-shaped rotatable member mounted on said fixed member and having a contact surface arranged to engage the contact surface of said friction element, and springs connected at their outer ends with said rotatable member and at their inner ends with said connecting plate.

14. In a device of the character described, a fixed member having its central portion offset to form an annular shoulder, an annular friction element mounted on said fixed member, having its outer portion beveled to form a contact surface and having its inner surface in engagement with and projecting above said shoulder, a connecting plate mounted on said offset portion of said fixed member and having an annular flange arranged to engage the inner surface of said friction element above said shoulder, a cup-shaped rotatable member mounted on said fixed member and having a contact surface arranged to engage the contact surface of said friction element, and springs connected at their inner ends with said connecting plate near the axis of rotation of said rotatable member, and connected at their outer ends with said rotatable member at points remote from said fixed member and from said axis.

15. In a device of the character described, a fixed member having its central portion offset to form an annular shoulder, a friction element mounted on said fixed member having its outer portion beveled to form a contact surface and having its inner surface in engagement with and extending above said shoulder, a connecting plate mounted on the offset portion of said fixed member, means for adjustably connecting said plate with said fixed member, said plate having an annular flange arranged to engage the inner surface of said friction element above said shoulder, a cup-shaped member rotatably mounted on said fixed member and having its edge flared outwardly to cooperate with the contact surface of said friction element and a plurality of springs connected at their inner ends with said connecting plate near the center thereof and connected at their outer ends with said rotatable member at points remote from the axis thereof.

16. In a device of the character described, a fixed member having a part provided with a friction surface, a second member rotatably mounted on said fixed member and having a friction surface to cooperate with the first mentioned friction surface, and springs connected at their ends with the respective members and each extending obliquely to the axis of rotation of said second member.

17. In a device of the character described, a fixed member having a part provided with a friction surface, a second member rotatably mounted on the fixed member and having a friction surface to cooperate with the first mentioned friction surface, said friction surfaces extending obliquely to the axis of rotation of said second member, and springs connected at their ends with the respective members and each extending at substantially a right angle to the plane of said friction surfaces.

18. In a device of the character described, a fixed member having a part provided with a friction surface, a second member rotatably mounted on the fixed member and having a friction surface to cooperate with the first mentioned friction surface, springs connected at their outer ends with said second member, and means for connecting the inner ends of said springs with said fixed member, said last mentioned connection being adjustable about the axis of rotation of said second member.

In testimony whereof, I affix my signature hereto.

CHARLES C. BLACKMORE.